(12) United States Patent
Nilsson et al.

(10) Patent No.: US 10,356,787 B2
(45) Date of Patent: Jul. 16, 2019

(54) BEAM TRAINING OF A RADIO TRANSCEIVER DEVICE

(71) Applicant: Telefonaktiebolaget LM Ericsson, Stockholm (SE)

(72) Inventors: Andreas Nilsson, Göteborg (SE); Fredrik Athley, Kullavik (SE)

(73) Assignee: Telefonaktiebolaget LM Ericsson (Publ) (SE)

( * ) Notice: Subject to any disclaimer, the term of this patent is extended or adjusted under 35 U.S.C. 154(b) by 0 days.

(21) Appl. No.: 15/573,694

(22) PCT Filed: Oct. 25, 2017

(86) PCT No.: PCT/EP2017/077215
§ 371 (c)(1),
(2) Date: Nov. 13, 2017

(87) PCT Pub. No.: WO2019/080999
PCT Pub. Date: May 2, 2019

(65) Prior Publication Data
US 2019/0124639 A1   Apr. 25, 2019

(51) Int. Cl.
*H04W 72/04*   (2009.01)
*H04L 5/00*   (2006.01)
(Continued)

(52) U.S. Cl.
CPC ........ *H04W 72/046* (2013.01); *H04B 7/0617* (2013.01); *H04L 5/0048* (2013.01); *H04W 72/085* (2013.01)

(58) Field of Classification Search
CPC . H04W 72/046; H04W 72/085; H04W 16/28; H04W 24/10; H04L 5/0048;
(Continued)

(56) References Cited

U.S. PATENT DOCUMENTS

2013/0235742 A1*  9/2013  Josiam .................. H04W 24/10
                                                              370/252
2014/0307654 A1   10/2014  Kim
(Continued)

FOREIGN PATENT DOCUMENTS

WO   WO-2017196491 A1 *  11/2017  ........... H04B 7/0408
WO   WO-2018127264 A1 *   7/2018  ........ H04W 36/0077

OTHER PUBLICATIONS

International Search Report and Written Opinion dated Jun. 20, 2018 for International Application No. PCT/EP2017/077215 filed on Oct. 25, 2017, consisting of 15-pages.

*Primary Examiner* — Paul H Masur
*Assistant Examiner* — Michael K Phillips
(74) *Attorney, Agent, or Firm* — Christopher & Weisberg, P.A.

(57) ABSTRACT

There are provided mechanisms for beam training. A method is performed by a radio transceiver device. The method includes initiating a beam sweep in a respective candidate beam set at each of N>1 antenna arrays for receiving a reference signal such that one occurrence of the reference signal is received in each of the beams in each respective candidate beam set. The method includes evaluating a beam setting performance metric for all possible beam settings except those beam settings comprising a beam for which the reference signal was received at a beam quality performance value below a beam quality threshold value.

22 Claims, 6 Drawing Sheets

(51) Int. Cl.
*H04W 72/08* (2009.01)
*H04B 7/06* (2006.01)

(58) Field of Classification Search
CPC ........... H04L 1/0021; H04L 2012/6489; H04L 25/062; H04L 25/063; H04L 43/16; H04L 47/29; H04L 1/0026; H04B 7/0695; H04B 7/0408; H04B 7/088; H04B 17/309
See application file for complete search history.

(56) References Cited

U.S. PATENT DOCUMENTS

| | | | |
|---|---|---|---|
| 2014/0334564 A1 | 11/2014 | Singh et al. | |
| 2015/0282122 A1 | 10/2015 | Kim | |
| 2016/0198474 A1* | 7/2016 | Raghavan | H04W 72/0466 370/335 |
| 2018/0069606 A1* | 3/2018 | Jung | H04B 7/0408 |
| 2018/0131434 A1* | 5/2018 | Islam | H01Q 1/246 |
| 2018/0192438 A1* | 7/2018 | Wilson | H04B 7/0695 |
| 2018/0220403 A1* | 8/2018 | Wilson | H04W 72/044 |
| 2018/0241494 A1* | 8/2018 | Chendamarai Kannan | H04J 11/0073 |
| 2018/0331748 A1* | 11/2018 | Hwang | H04B 7/0486 |
| 2018/0367270 A1* | 12/2018 | Raghavan | H04B 7/0617 |

* cited by examiner

BEAM TRAINING OF A RADIO TRANSCEIVER DEVICE

CROSS-REFERENCE TO RELATED APPLICATIONS

This application is a Submission Under 35 U.S.C. § 371 for U.S. National Stage Patent Application of International Application Number: PCT/EP2017/077215, filed Oct. 25, 2017 entitled " BEAM TRAINING OF A RADIO TRANSCEIVER DEVICE," the entirety of which is incorporated herein by reference.

TECHNICAL FIELD

Embodiments presented herein relate to a method, a radio transceiver device, a computer program, and a computer program product for beam training of the radio transceiver device.

BACKGROUND

In communications networks, there may be a challenge to obtain good performance and capacity for a given communications protocol, its parameters and the physical environment in which the communications network is deployed.

For example, for future generations of mobile communications networks, frequency bands at many different carrier frequencies could be needed. For example, low such frequency bands could be needed to achieve sufficient network coverage for terminal devices and higher frequency bands (e.g. at millimeter wavelengths (mmW), i.e. near and above 30 GHz) could be needed to reach required network capacity. In general terms, at high frequencies the propagation properties of the radio channel are more challenging and beamforming both at the network node of the network and at the terminal devices might be required to reach a sufficient link budget.

In a communications network where a terminal device at the user side uses narrow beams for reception (and transmission), at least one of the transmission beams transmitted from a transmission and reception point (TRP) at the network node is assumed to be discovered and monitored by the terminal device. This process of discovering and monitoring at the user side is referred to as beam training. In order to perform beam training the terminal device uses measurements (such as reference signal received power; RSRP) on downlink reference signals (such as channel state information reference signals; CSI-RS). The beam pair for which the highest received reference signal power was obtained is then used as the active beam pair link. In general terms, a beam pair is defined by a transmission beam at the transmitting end (such as at the TRP) and a corresponding reception beam at the receiving end (such as at the terminal device), where the transmission beam and the reception beam are selected from sets of available candidate beams so as to maximize a quality criterion (such as highest reference signal received power) for transmission from the transmitting end to the receiving end.

The CSI-RS for beam training might be transmitted periodically, semi-persistently or a periodically (for example when being event triggered) and they might either be shared between multiple terminal devices or be specific for a certain terminal device, or group of terminal devices.

In order for the terminal device to find a suitable reception beam to receive data and control signalling from the TRP, the TRP transmits CSI-RS in different transmission beams on which the terminal devices perform measurements. FIG. 1 is a signalling diagram of beam training of a terminal device.

S1: The TRP transmits a burst of CSI-RS in a transmission beam with as many occurrences of the CSI-RS in the burst as there are reception beams per antenna array in the terminal device.

S2: The terminal device sweeps through all beams for all its antenna arrays simultaneously. For each beam and antenna array, the terminal performs measurements on the CSI-RS and stores the measurements.

S3: The terminal device evaluates user throughput for all different combinations of reception beams over all its antenna arrays S4: The terminal device selects a beam setting with one reception beam at each antenna array yielding highest estimated user throughput.

Evaluating the expected user throughput for a certain channel measurement is computationally heavy, which will heat up and increase the power consumption of the terminal device. For example, if the terminal device has an interference rejection combining (IRC) receiver the terminal device has to calculate a matrix inverse, which is considered computationally heavy. If multiple antenna arrays at the terminal device are used, and multiple reception beams at each antenna array, there are many possible beam settings (with one beam from each antenna array per beam setting) to evaluate.

Hence, there is a need for improved beam training.

SUMMARY

An object of embodiments herein is to provide efficient beam training where the above issues are resolved, or at least mitigated or reduced.

According to a first aspect there is presented a method for beam training. The method is performed by a radio transceiver device. The method comprises initiating a beam sweep in a respective candidate beam set at each of $N>1$ antenna arrays for receiving a reference signal such that one occurrence of the reference signal is received in each of the beams in each respective candidate beam set. The method comprises evaluating a beam setting performance metric for all possible beam settings except those beam settings comprising a beam for which the reference signal was received at a beam quality performance value below a beam quality threshold value.

According to a second aspect there is presented a radio transceiver device for beam training. The radio transceiver device comprises processing circuitry. The processing circuitry is configured to cause the radio transceiver device to initiate a beam sweep in a respective candidate beam set at each of $N>1$ antenna arrays for receiving a reference signal such that one occurrence of the reference signal is received in each of the beams in each respective candidate beam set. The processing circuitry is configured to cause the radio transceiver device to evaluate a beam setting performance metric for all possible beam settings except those beam settings comprising a beam for which the reference signal was received at a beam quality performance value below a beam quality threshold value.

According to a third aspect there is presented a radio transceiver device for beam training. The radio transceiver device comprises an initiate module configured to initiate a beam sweep in a respective candidate beam set at each of $N>1$ antenna arrays for receiving a reference signal such that one occurrence of the reference signal is received in each of the beams in each respective candidate beam set. The radio transceiver device comprises an evaluate module configured to evaluate a beam setting performance metric for all possible beam settings except those beam settings comprises a beam for which the reference signal was received at a beam quality performance value below a beam quality threshold value.

According to a fourth aspect there is presented a computer program for beam training, the computer program comprising computer program code which, when run on a radio transceiver device, causes the radio transceiver device to perform a method according to the first aspect.

According to a fifth aspect there is presented a computer program product comprising a computer program according to the fourth aspect and a computer readable storage medium on which the computer program is stored. The computer readable storage medium could be a non-transitory computer readable storage medium.

Advantageously this method, these radio transceiver devices, this computer program, and this computer program product provide efficient beam training.

Advantageously this method, these radio transceiver devices, this computer program, and this computer program product provide beam training not suffering from the above issues, or at least where these issues are mitigated or reduced.

Advantageously this method, these radio transceiver devices, this computer program, and this computer program product enables the computational requirements needed for performing beam training to be reduced, without loss in performance.

It is to be noted that any feature of the first, second, third, fourth, and fifth aspects may be applied to any other aspect, wherever appropriate. Likewise, any advantage of the first aspect may equally apply to the second, third, fourth, and/or fifth aspect, respectively, and vice versa. Other objectives, features and advantages of the enclosed embodiments will be apparent from the following detailed disclosure, from the attached dependent claims as well as from the drawings.

Generally, all terms used in the claims are to be interpreted according to their ordinary meaning in the technical field, unless explicitly defined otherwise herein. All references to "a/an/the element, apparatus, component, means, module, step, etc." are to be interpreted openly as referring to at least one instance of the element, apparatus, component, means, module, step, etc., unless explicitly stated otherwise. The steps of any method disclosed herein do not have to be performed in the exact order disclosed, unless explicitly stated.

BRIEF DESCRIPTION OF THE DRAWINGS

The inventive concept is now described, by way of example, with reference to the accompanying drawings, in which.

DETAILED DESCRIPTION

The inventive concept will now be described more fully hereinafter with reference to the accompanying drawings, in which certain embodiments of the inventive concept are shown. This inventive concept may, however, be embodied in many different forms and should not be construed as limited to the embodiments set forth herein; rather, these embodiments are provided by way of example so that this disclosure will be thorough and complete, and will fully convey the scope of the inventive concept to those skilled in the art. Like numbers refer to like elements throughout the description. Any step or feature illustrated by dashed lines should be regarded as optional.

Figure 1:
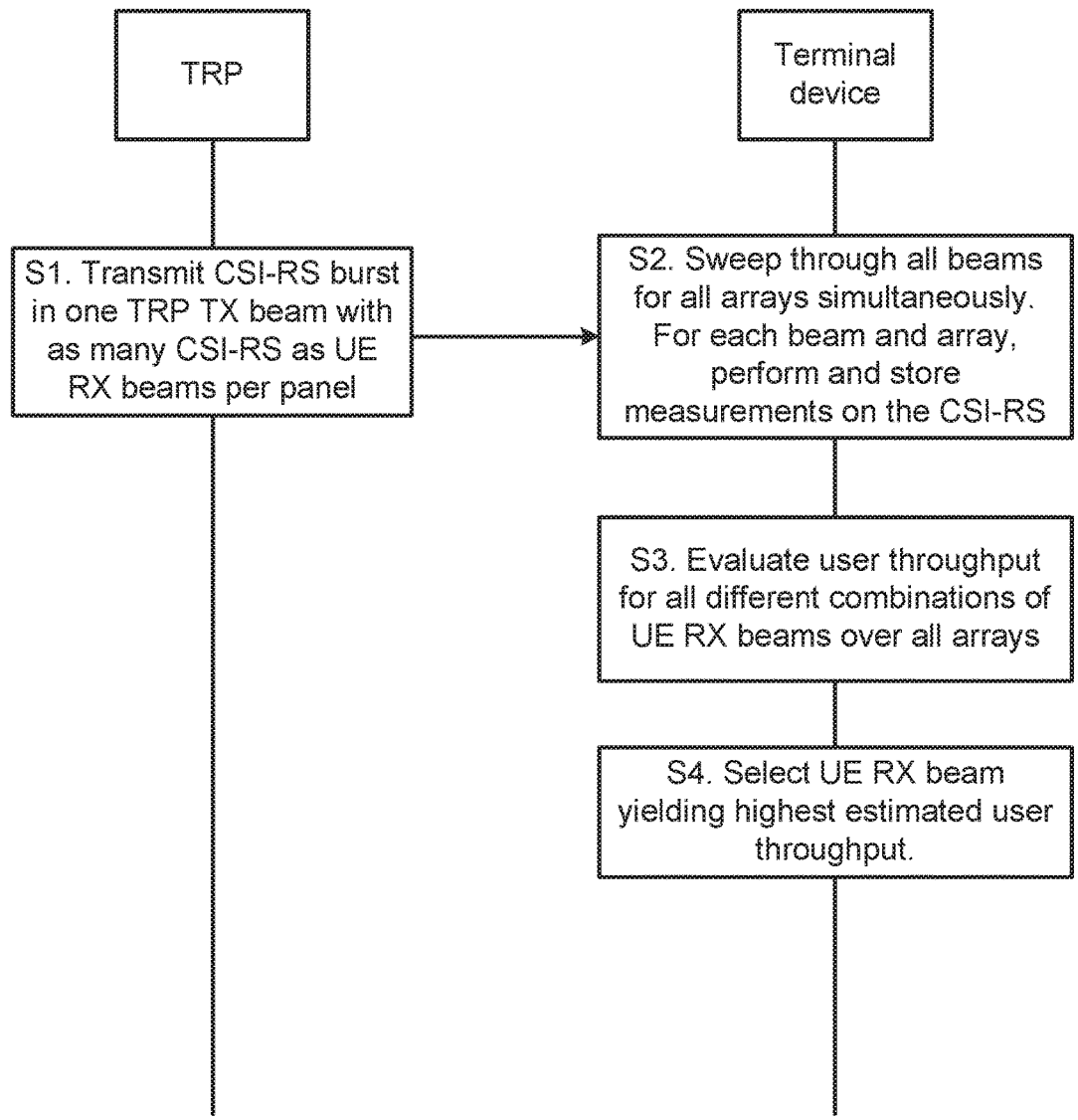
FIG. 1 is a signalling diagram according to state of the art.
Figure 2:
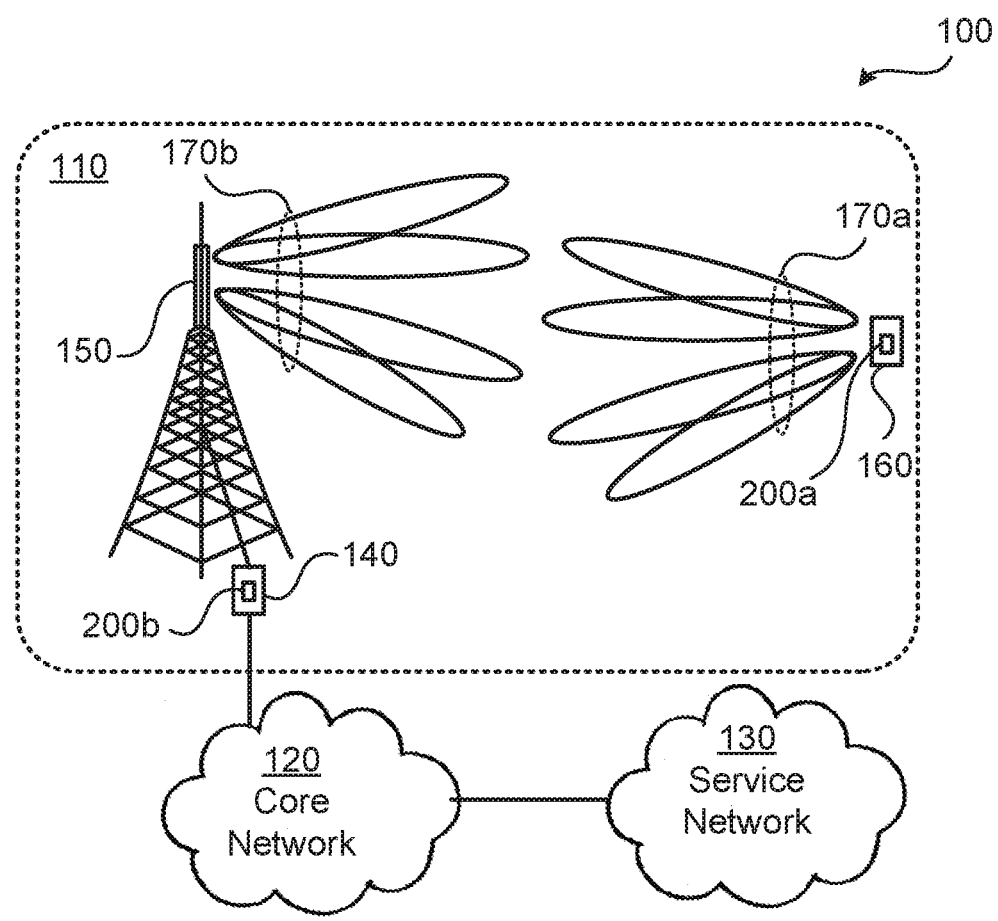
FIG. 2 is a schematic diagram illustrating a communications network according to embodiments.

FIG. 2 is a schematic diagram illustrating a communications network 100 where embodiments presented herein can be applied.

The communications network 100 comprises a network node 140 configured to, via a TRP 150, provide network access to a terminal device 160 in a radio access network 110. In some embodiments a radio transceiver device 200a is part of, integrated with, or collocated with, the terminal device 160. In some embodiments a radio transceiver device 200b is part of, integrated with, or collocated with the network node 140 or the TRP 150.

The radio access network 110 is operatively connected to a core network 120. The core network 120 is in turn operatively connected to a service network 130, such as the Internet. Terminal device 160 is thereby, via the TRP 150 and network node 140, enabled to access services of, and exchange data with, the service network 130.

Examples of network nodes are radio access network nodes, radio base stations, base transceiver stations, Node Bs, evolved Node Bs, g Node Bs, access points, and access nodes. Examples of terminal devices are terminal devices, mobile stations, mobile phones, handsets, wireless local loop phones, user equipment (UE), smartphones, laptop computers, tablet computers, network equipped sensors, network equipped vehicles, and so-called Internet of Things devices.

The herein disclosed embodiments can be applied at a radio transceiver device 200a being part of, integrated with, or collocated with, the terminal device 160 as well as at a radio transceiver device 200b being part of, integrated with, or collocated with, the network node 140.

The radio transceiver devices 200a, 200b are, via the TRP 150, configured to communicate with each other in beams 170a, 170b. The radio transceiver devices 200a, 200b could be configured to communicate using a variety of beams having different shapes and widths, herein generally referred to as having different beam patterns.

Figure 3:
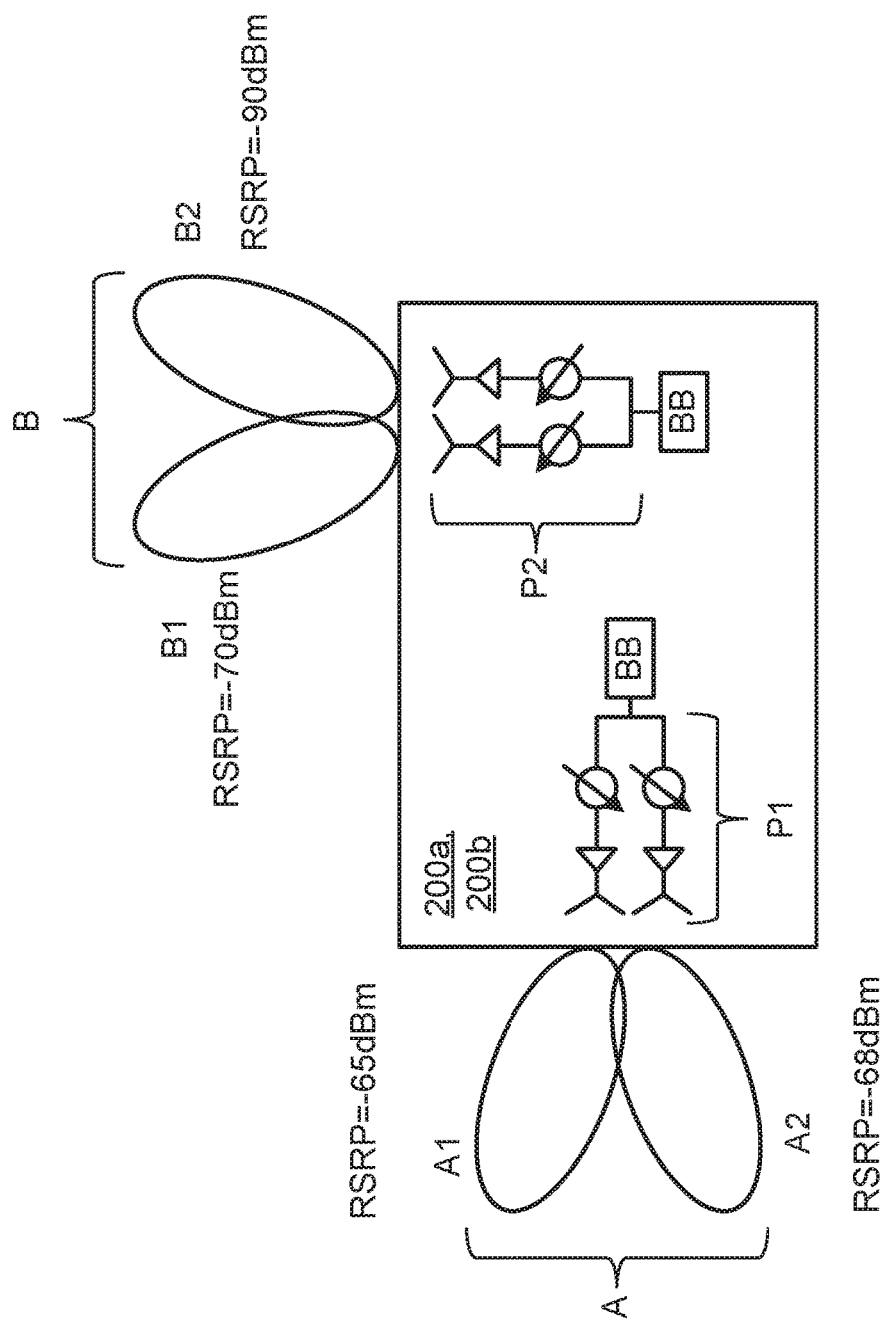
FIG. 3 is a schematic diagram of a radio transceiver device according to an embodiment.

One embodiment of the radio transceiver device 200a, 200b is illustrated in FIG. 3. FIG. 3 is a schematic diagram of a radio transceiver device 200a, 200b according to an embodiment. The radio transceiver device 200a, 200b comprises at least two antenna arrays P1, P2. In general terms, the radio transceiver device 200a, 200b comprises N>1 antenna arrays, where N is an integer. Each such antenna array might be referred to as a panel. Each antenna array is operatively connected to a baseband (BB) unit. It could be that two or more antenna arrays share the same common baseband unit via a switch, such that at one time, one of these antenna arrays is operatively connected to the common baseband unit. As such, each antenna array comprises components such as antenna elements (either single polarized or dual polarized), phase adjusters, power amplifiers, low noise amplifiers, etc. Each antenna array is configured to generate beams in a respective set of beams, in the illustrative example of FIG. 3 denoted A and B. In more detail, according to the illustrative example in FIG. 3, beams A1, A2 belonging to the set of beams A are generated at the antenna array denoted P1, and beams B1, B2 belonging to the set of beams B are generated at the antenna array denoted P2. Beams A1, A2, B1, B2 collectively make up the beams 170a and/or the beams 170b in FIG. 2, depending on where the radio transceiver device 200a, 200b is located (i.e., as being part of, integrated with, or collocated with, the terminal device 160 and/or being part of, integrated with, or collocated with, the network node 140).

As disclosed above, during beam training, the device to be trained receives reference signals in its beams and then evaluates all the beam settings. For the radio transceiver device 200a, 200b of FIG. 3 this would imply that four beam settings (A1, B1), (A2, B2), (A2, B1), and (A2, B2) needs to be evaluated. Assuming that the radio transceiver device 200a, 200b comprises N antenna arrays, with M beams per antenna array, there would be $M^N$ possible beam settings to evaluate which already for small values or N and M would yield many possible beam settings to evaluate; with N=4 and M=8 there are $8^4$=4096 possible beam settings to evaluate which might be too computationally heavy for some radio transceiver devices 200a, 200b.

As noted above it is computationally heavy to evaluate each beam setting. The embodiments disclosed herein therefore relate to mechanisms for beam training where the above issues are resolved, or at least mitigated or reduced. In order to obtain such mechanisms there is provided a radio transceiver device 200a, 200b, a method performed by the radio transceiver device 200a, 200b, a computer program product comprising code, for example in the form of a computer program, that when run on a radio transceiver device 200a, 200b, causes the radio transceiver device 200a, 200b to perform the method.

Figure 4:
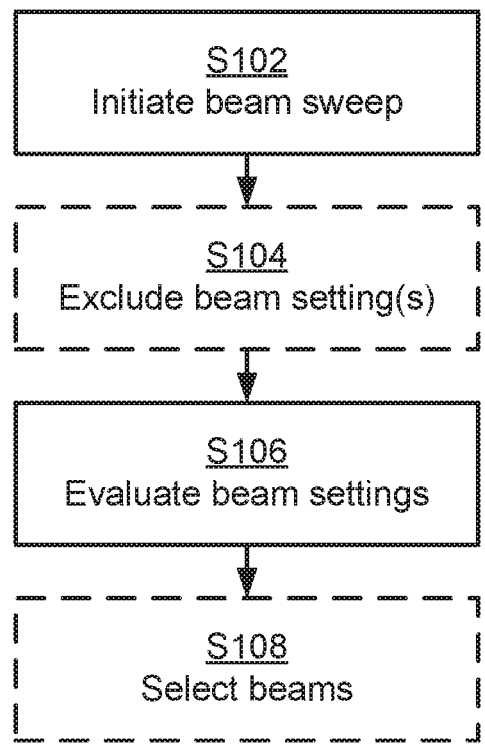
FIG. 4 is a flowchart of methods according to embodiments.

FIG. 4 is a flowchart illustrating embodiments of methods for beam training. The methods are performed by the radio transceiver device 200a, 200b. The methods are advantageously provided as computer programs 820.

During the beam training, a beam sweep is made so as to receive a reference signal in a possible beam involved in the beam training. These beams are referred to as candidate beam sets, where each antenna array has its own candidate beam set. Particularly, the radio transceiver device 200a, 200b is configured to perform step S102:

S102: The radio transceiver device 200a, 200b initiates a beam sweep in a respective candidate beam set (such as in beam sets A, B in FIG. 3) at each of N>1 antenna arrays P1, P2 for receiving a reference signal such that one occurrence of the reference signal is received in each of the beams (such as in each of beams A1, A2, B1, B2 in FIG. 3) in each respective candidate beam set (such as in beam sets A, B in FIG. 3).

However, in contrast to prior art, not all beam settings are evaluated. Particularly, the radio transceiver device 200a, 200b is configured to perform step S106:

S106: The radio transceiver device 200a, 200b evaluates a beam setting performance metric for all possible beam settings except those beam settings comprising a beam (such as beam B2 in FIG. 3) for which the reference signal was received at a beam quality performance value below a beam quality threshold value.

By not having to evaluate all beam settings, this allows for efficient beam training of the radio transceiver device 200a, 200b.

Embodiments relating to further details of beam training as performed by the radio transceiver device 200a, 200b will now be disclosed.

There may be different ways to define the beam settings. In general terms, each beam setting is defined in terms of which beam, or beams, it comprises.

In some aspects each beam setting is defined in terms of an N-tuple of beams. That is, according to an embodiment each beam setting is defined by an N-tuple consisting of N beams, with one beam from each respective candidate beam set. This means that all beam settings include the same number of beams; one from every antenna array. That is, with reference to the illustrative example of FIG. 3, assuming that in beam B2 the reference signal was received at a beam quality performance value below the beam quality threshold value, only beam settings (A1, B1) and (A2, B1) would be evaluated in step S106.

In some aspects there could be some beam settings that do not have beams from all antenna arrangements, such that there is only one single beam in one or more beam settings. This allows all beams of a given antenna array to be excluded during the evaluation in step S106. Particularly, according to an embodiment, when at least one of the antenna arrays (such as P2) only have beams for which the reference signal was received at respective beam quality performance values below the beam quality threshold value, these beams are excluded from the beam settings such that each beam setting consists of at least one beam but less than N beams. That is, with reference to the illustrative example of FIG. 3, assuming that in both beams B1 and B2 the reference signal was received at a beam quality performance value below the beam quality threshold value, only beam settings (A1) and (A2) would be evaluated in step S106.

Since step S106 relates to the reference signal being received at a beam quality performance value below a beam quality threshold value, it is at least implicitly assumed that embodiment a respective beam quality performance value is determined for each beam in each respective candidate beam set such that it can be checked whether or not the reference signal in any of the beams A1, A2, B1, B2 is received at a beam quality performance value below the beam quality threshold value There may be different ways to set the beam quality threshold value.

In some aspects the beam quality threshold value is fixed. Particularly, according to an embodiment the beam quality threshold value is fixed and independent from the respective beam quality performance values. One advantage with having a fixed beam quality threshold value is that the radio transceiver device 200a, 200b is enabled to directly exclude any beam with beam quality performance value below the beam quality threshold value, and in this way save temporary memory. Returning to the illustrative example of FIG. 3, assuming that the fixed beam quality threshold value is set to −80 dBm, beam B2 would be excluded since its RSRP value is worse than the fixed beam quality threshold value.

In some aspects the beam quality threshold value is relative. Particularly, according to an embodiment the beam quality threshold value is relative per candidate beam set and is selected relative highest beam quality performance value per candidate beam set. One advantage with having a relative beam quality threshold value is that this might allow all beam settings to be defined in terms of an N-tuple of beams; one beam from each antenna array. One way to select the relative beam quality threshold value is to, for each antenna array, define the beam quality threshold value as being some amount lower (such as 5, 10, or 15 dB lower) than the highest beam quality performance value of that antenna array. Returning to the illustrative example of FIG. 3, assuming that the relative beam quality threshold value is set to 10 dB, beam B2 would be excluded since its RSRP value is more than 10 dB worse than the RSRP value of beam B1.

In some aspects the beam quality threshold value is first fixed and then relative. Particularly, according to an embodiment the beam quality threshold value first is fixed and then, if all beam quality performance values of the same candidate beam set are below the fixed beam quality threshold value, the beam quality threshold value is relative.

Returning to the illustrative example of FIG. 3, assuming that the fixed beam quality threshold value is set to −69 dBm, both beams B1 and B2 would be excluded since their respective RSRP values are worse than the fixed beam quality threshold value. Since this results in all beams from antenna array P2 are excluded, the beam quality threshold value might then be relative, such as 10 dB, only beam B2 would be excluded. One advantage with having a beam quality threshold value that could be either fixed or relative is that this might allow all beam settings to be defined in terms of an N-tuple of beams; one beam from each antenna array, in cases where the fixed beam quality threshold value yields exclusion of too many beams, such as all beams of an antenna array, or exclusion of too few beams, such as no beams at all.

There may be different types of beam quality threshold values. According to an embodiment the beam quality threshold value is defined as reference signal received power, reference signal received quality, signal to noise ratio, or signal to interference plus noise ratio.

In some aspects, which beam quality threshold value to use and/or what type of beam quality threshold value to use is dependent on what type of radio transceiver device the radio transceiver device 200a, 200b is.

There may be different types of beam setting performance metrics. According to an embodiment the beam setting performance metric is defined as expected user throughput, channel quality indicator, channel quality indicator per layer, mutual information, or signal to noise ratio.

In some aspects, which beam setting performance metric to use is dependent on what type of radio transceiver device the radio transceiver device 200a, 200b is.

As noted above, the evaluation in step S106 is not performed for all beam settings. Therefore, according to an embodiment the radio transceiver device 200a, 200b is configured to perform (optional) step S104:

S104: The radio transceiver device 200a, 200b excludes, prior to evaluating the beam setting performance metric, any beam setting comprising a beam for which the reference signal was received at a beam quality performance value below the beam quality threshold value.

In some aspects the evaluation in step S106 results in one beam setting being selected. Particularly, according to an embodiment the radio transceiver device 200a, 200b is configured to perform (optional) step S108:

S108: The radio transceiver device 200a, 200b selects, for future reception of at least one of control signalling and data signalling, those beams in the beam settings having best beam setting performance metric.

In some aspects, the determined beam setting is also be applied for transmission. In more detail, in case of radio propagation channel reciprocity between downlink and uplink (within each antenna array), the beams selected for future reception of at least one of control signalling and data signalling might also be selected for future transmission. That is, according to an embodiment the selected beams also are selected for future transmission of signals.

Then, according to an embodiment, which beam quality threshold value to use and/or what type of beam quality threshold value to use is dependent on whether the selected beams are to be used for future reception or future transmission.

In other aspects, different beams are selected for future reception and future transmission. The radio transceiver device 200a, 200b will then switch between the beams for reception and the beams for transmission depending on if the radio transceiver device 200a, 200b receives or transmits.

Then, according to an embodiment, which beam setting performance metric to use is dependent on whether the selected beams are to be used for future reception or future transmission. For example, the beams for reception might be selected based on estimated user throughput and the beams for transmission might be selected based on highest RSRP.

In further aspects, the radio transceiver device 200a, 200b might be aware of information comprising the highest number of layers that the other radio transceiver device 200a, 200b transmitting the reference signals is configured to transmit and/or receive. The radio transceiver device 200a, 200b might then use this information when determining the estimated throughput. In some aspects this information is signaled from the other radio transceiver device 200a, 200b transmitting the reference signals. In other aspects the radio transceiver device 200a, 200b uses logged information about maximum number of layers used during previous data transmissions with the other radio transceiver device 200a, 200b and based on this information estimates the maximum number of layers for the other radio transceiver device 200a, 200b.

Figure 5:
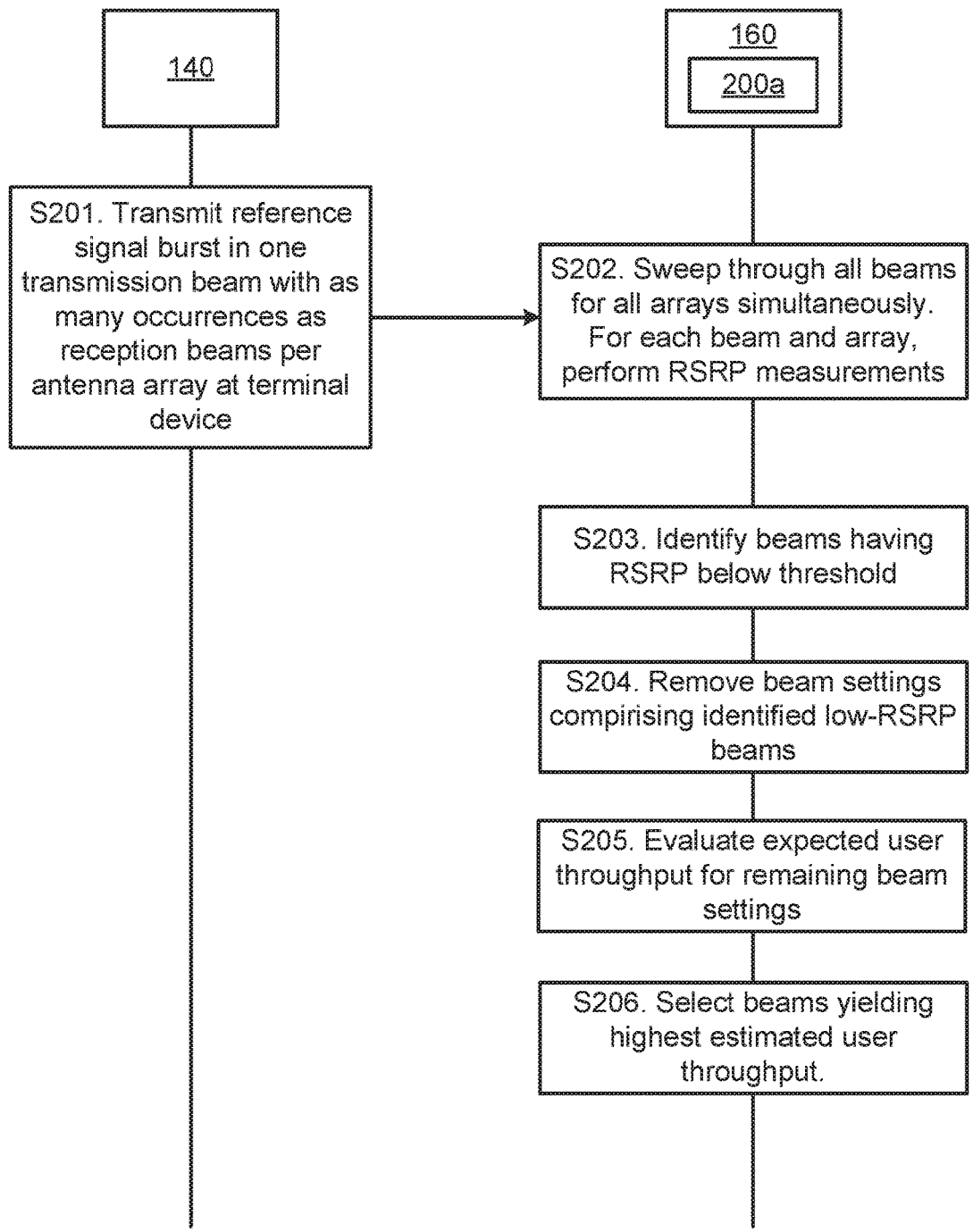
FIG. 5 is a signalling diagram according to an embodiment.

Reference is now made to the signalling diagram of FIG. 5 illustrating one particular embodiment for beam training based on at least some of the embodiments disclosed above. In the example of FIG. 5 the radio transceiver device 200a is part of a terminal device 160.

S201: The network node 140 transmits a burst of reference signals in a transmission beam with as many occurrences of the reference signal in the burst as there are reception beams per antenna array at the radio transceiver device 200a of the terminal device 160.

S202: The terminal device 160 initiates a beam sweep in all beams of each antenna array for receiving the reference signals transmitted by the network node 140 such that one occurrence of the reference signal is received in each of all the beams. One way to implement step S202 is to perform step S102.

S203: The terminal device 160 identifies all beams for each respective antenna array where the reference signal was received at a beam quality performance value, such as reference signal received power, below a beam quality threshold value (either fixed or relative). One way to implement step S203 is to perform step S104 or S106.

S204: The terminal device 160 excludes all beam settings containing any of the beams identified in step S203. One way to implement step S204 is to perform step S104.

S205: The terminal device 160 evaluates a beam setting performance metric, such as the expected user throughput, for all remaining beam settings. One way to implement step S205 is to perform step S106.

S206: The terminal device 160 selects the beam setting with highest beam setting performance metric value, such as highest expected user throughput. One way to implement step S206 is to perform step S108.

Figure 6:
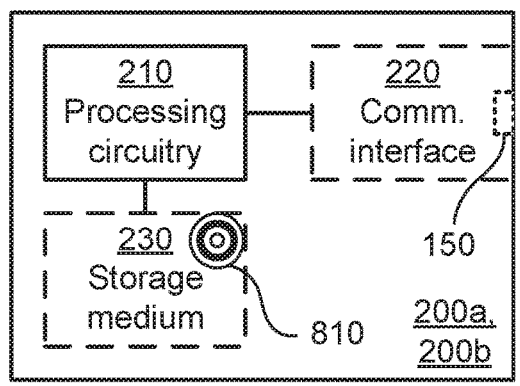
FIG. 6 is a schematic diagram showing functional units of a radio transceiver device according to an embodiment.

FIG. 6 schematically illustrates, in terms of a number of functional units, the components of a radio transceiver device 200a, 200b according to an embodiment. Processing circuitry 210 is provided using any combination of one or more of a suitable central processing unit (CPU), multiprocessor, microcontroller, digital signal processor (DSP), etc., capable of executing software instructions stored in a computer program product 810 (as in FIG. 8), e.g. in the form of a storage medium 230. The processing circuitry 210 may further be provided as at least one application specific integrated circuit (ASIC), or field programmable gate array (FPGA).

Particularly, the processing circuitry 210 is configured to cause the radio transceiver device 200a, 200b to perform a set of operations, or steps, S102-S108, and S203-S207 as disclosed above. For example, the storage medium 230 may store the set of operations, and the processing circuitry 210 may be configured to retrieve the set of operations from the storage medium 230 to cause the radio transceiver device 200a, 200b to perform the set of operations. The set of operations may be provided as a set of executable instructions.

Thus the processing circuitry 210 is thereby arranged to execute methods as herein disclosed. The storage medium 230 may also comprise persistent storage, which, for example, can be any single one or combination of magnetic memory, optical memory, solid state memory or even remotely mounted memory. The radio transceiver device 200a, 200b may further comprise a communications interface 220 at least configured for communications with another radio transceiver device 200a, 200b as well as with other entities, nodes, devices, and functions of the communications network 100. As such the communications interface 220 may comprise one or more transmitters and receivers, comprising analogue and digital components. In some aspects where the radio transceiver device 200b is part of, integrated with, or collocated with the network node 140, communications interface 220 might comprise the TRP 150.

The processing circuitry 210 controls the general operation of the radio transceiver device 200a, 200b e.g. by sending data and control signals to the communications interface 220 and the storage medium 230, by receiving data and reports from the communications interface 220, and by retrieving data and instructions from the storage medium 230. Other components, as well as the related functionality, of the radio transceiver device 200a, 200b are omitted in order not to obscure the concepts presented herein.

Figure 7:
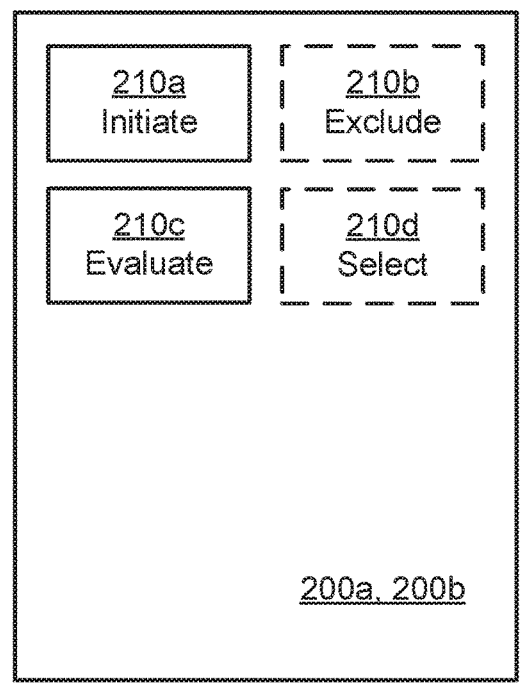
FIG. 7 is a schematic diagram showing functional modules of a radio transceiver device according to an embodiment.

FIG. 7 schematically illustrates, in terms of a number of functional modules, the components of a radio transceiver device 200a, 200b according to an embodiment. The radio transceiver device 200a, 200b of FIG. 7 comprises a number of functional modules; an initiate module 210a configured to perform step S102 and an evaluate module 210c configured to perform step S106. The radio transceiver device 200a, 200b of FIG. 7 may further comprise a number of optional functional modules, such as any of an exclude module 210b configured to perform step S104 and a select module 210d configured to perform step S108. In general terms, each functional module 210a-210d may in one embodiment be implemented only in hardware and in another embodiment with the help of software, i.e., the latter embodiment having computer program instructions stored on the storage medium 230 which when run on the processing circuitry makes the radio transceiver device 200a, 200b perform the corresponding steps mentioned above in conjunction with FIG. 7. It should also be mentioned that even though the modules correspond to parts of a computer program, they do not need to be separate modules therein, but the way in which they are implemented in software is dependent on the programming language used. Preferably, one or more or all functional modules 210a-210d may be implemented by the processing circuitry 210, possibly in cooperation with the communications interface 220 and/or the storage medium 230. The processing circuitry 210 may thus be configured to from the storage medium 230 fetch instructions as provided by a functional module 210a-210d and to execute these instructions, thereby performing any steps as disclosed herein.

The radio transceiver device 200a, 200b may be provided as a standalone device or as a part of at least one further device. For example, in accordance with the illustrative example of FIG. 2 the radio transceiver device 200a might be, or be part of, a terminal device 160, or the radio transceiver device 200b might be, or be part of, a network node 140. For example, the network node 140 (comprising the radio transceiver device 200b) might be provided in a node of the radio access network 110 or in a node of the core network 120. Further, functionality of the radio transceiver device 200a, 200b may be distributed between at least two devices, or nodes. Thus, a first portion of the instructions performed by the radio transceiver device 200a, 200b may be executed in a first device, and a second portion of the of the instructions performed by the radio transceiver device 200a, 200b may be executed in a second device; the herein disclosed embodiments are not limited to any particular number of devices on which the instructions performed by the radio transceiver device 200a, 200b may be executed. Hence, the methods according to the herein disclosed embodiments are suitable to be performed by a radio transceiver device 200a, 200b residing in a cloud computational environment. Therefore, although a single processing circuitry 210 is illustrated in FIG. 6 the processing circuitry 210 may be distributed among a plurality of devices, or nodes. The same applies to the functional modules 210a-210d of FIG. 7 and the computer program 820 of FIG. 8 (see below).

Figure 8:
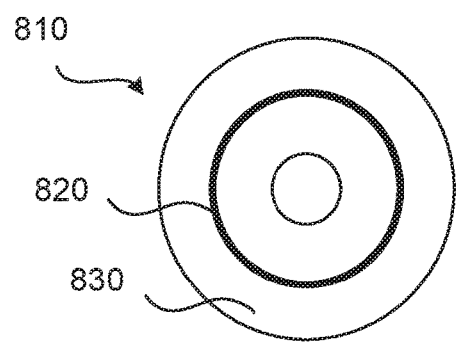
FIG. 8 shows one example of a computer program product comprising computer readable storage medium according to an embodiment.

FIG. 8 shows one example of a computer program product 810 comprising computer readable storage medium 830. On this computer readable storage medium 830, a computer program 820 can be stored, which computer program 820 can cause the processing circuitry 210 and thereto operatively coupled entities and devices, such as the communications interface 220 and the storage medium 230, to execute methods according to embodiments described herein. The computer program 820 and/or computer program product 810 may thus provide means for performing any steps as herein disclosed.

In the example of FIG. 8, the computer program product 810 is illustrated as an optical disc, such as a CD (compact disc) or a DVD (digital versatile disc) or a Blu-Ray disc. The computer program product 810 could also be embodied as a memory, such as a random access memory (RAM), a read-only memory (ROM), an erasable programmable read-only memory (EPROM), or an electrically erasable programmable read-only memory (EEPROM) and more particularly as a non-volatile storage medium of a device in an external memory such as a USB (Universal Serial Bus) memory or a Flash memory, such as a compact Flash memory. Thus, while the computer program 820 is here schematically shown as a track on the depicted optical disk, the computer program 820 can be stored in any way which is suitable for the computer program product 810.

The inventive concept has mainly been described above with reference to a few embodiments. However, as is readily appreciated by a person skilled in the art, other embodiments than the ones disclosed above are equally possible within the scope of the inventive concept, as defined by the appended patent claims.

The invention claimed is:

1. A method for beam training, the method being performed by a radio transceiver device, the method comprising:
   initiating a beam sweep in a resepective candidate beam set at each of N>1 antenna arrays for receiving a reference signal such that one occurrence of the reference signal is received in each of the beams in each respective candidate beam set; and
   evaluating a beam setting performance metric for all possible beam settings except those beam settings comprising a beam for which the reference signal was received at a beam quality performance value below a fixed beam quality threshold value and when no reference signal has abeam quality performance value that exceeds the fixed beam quality threshold value, then evaluating the beam setting performance metric for all possible beam settings except those beam settings comprising a beam for which the reference signal has a beam quality performance value below a relative beam quality threshold value.

2. The method according to claim 1, wherein each beam setting is defined by an N-tupple consisting of N beams, with one beam from each respective candidate beam set, where N is an integer greater than 1.

3. The method according to claim 1, wherein, when at least one of the antenna arrays only have beams for which the reference signal was received at respective beam quality performance values below the fixed beam quality threshold value, these beams are excluded from the beam settings such that each beam setting consists of at least one beam but less than N beams, where N is an integer greater than 1.

4. The method according to claim 1, wherein a respective beam quality performance value is determined for each beam in each respective candidate beam set.

5. The method according to claim 4, wherein the fixed beam quality threshold value is fixed and independent from the respective beam quality performance values.

6. The method according to claim 4, wherein the relative beam quality threshold value is relative per candidate beam set and is selected relative to the highest beam quality performance value per candidate beam set.

7. The method according to claim 1, wherein the fixed beam quality threshold value is defined as one of reference signal received power, reference signal received quality, signal to noise ratio, and signal to interference plus noise ratio.

8. The method according to claim 1, wherein the beam setting performance metric is defined as one of expected user throughput, channel quality indicator, channel quality indicator per layer, mutual information, and signal to noise ratio.

9. The method according to claim 1, further comprising:
   excluding, prior to evaluating the beam setting performance metric, any beam setting comprising a beam for which the reference signal was received at a beam quality performance value below the fixed beam quality threshold value.

10. The method according to claim 1, further comprising:
    selecting, for future reception of at least one of control signalling and data signalling, those beams in the beam settings having best beam setting performance metric.

11. The method according to claim 10, wherein the selected beams also are selected for future transmission of signals.

12. The method according to claim 7, wherein at least one taken from the group consisting of which fixed beam quality threshold value to use and what type of fixed beam quality threshold value to use is dependent on whether selected beams are to be used for future reception or future transmission.

13. The method according to claim 8, wherein which beam setting performance metric to use is dependent on whether selected beams are to be used for future reception or future transmission.

14. The method according to claim 7, wherein at least one taken from the group consisting of which fixed beam quality threshold value to use and what type of fixed beam quality threshold value to use is dependent on a type of radio transceiver device comprising the radio transceiver device.

15. The method according to claim 8, wherein which beam setting performance metric to use is dependent on a type of radio transceiver device comprising the radio transceiver device.

16. The method according to claim 1, wherein the radio transceiver device is at least a part of a terminal device.

17. The method according to claim 1, wherein the radio transceiver device is at least a part of a network node.

18. A radio transceiver device for beam training, the radio transceiver device comprising processing circuitry, the processing circuitry being configured to cause the radio transceiver device to:
    initiate a beam sweep in a respective candidate beam set at each of N>1 antenna arrays for receiving a reference signal such that one occurrence of the reference signal is received in each of the beams in each respective candidate beam set; and
    evaluate a beam setting performance metric for all possible beam settings except those beam settings comprising a beam for which the reference signal was received at a beam quality performance value below a fixed beam quality threshold value and when no reference signal has a beam quality performance value that exceeds the fixed beam quality threshold value, then evaluate the beam setting performance metric for all possible beam settings except those beam settings comprising a beam for which the reference signal has a beam quality performance value below a relative beam quality threshold value.

19. The radio transceiver device according to claim 18, wherein the radio transceiver device is at least a part of a terminal device.

20. The radio transceiver device according to claim 18, wherein the radio transceiver device is at least a part of a network node.

21. A radio transceiver device for beam training, the radio transceiver device comprising:
    an initiate module configured to initiate a beam sweep in a respective candidate beam set at each of N>1 antenna arrays for receiving a reference signal such that one occurrence of the reference signal is received in each of the beams in each respective candidate beam set; and an evaluate module configured to evaluate a beam setting performance metric for all possible beam settings except those beam settings comprising a beam for which the reference signal was received at a beam quality performance value below a fixed beam quality threshold value and when no reference signal has a beam quality performance value that exceeds the fixed beam quality threshold value, then the evaluate module is configured to evaluate the beam setting performance metric for all possible beam settings except those beam settings comprising a beam for which the reference signal has a beam quality performance value below a relative beam quality threshold value.

22. A computer storage device storing a computer program for beam training, the computer program comprising computer code which, when run on processing circuitry of a radio transceiver device, causes the radio transceiver device to:

initiate a beam sweep in a respective candidate beam set at each of N>1 antenna arrays for receiving a reference signal such that one occurrence of the reference signal is received in each of the beams in each respective candidate beam set; and evaluate a beam setting performance metric for all possible beam settings except those beam settings comprising a beam for which the reference signal was received at a beam quality performance value below a fixed beam quality threshold value and when no reference signal has a beam quality performance value that exceeds the fixed beam quality threshold value, then evaluate the beam setting performance metric for all possible beam settings except those beam settings comprising a beam for which the reference signal has abeam quality performance value below a relative beam quality threshold value.

* * * * *